US005790339A

United States Patent [19]

Tagiri

[11] Patent Number: 5,790,339

[45] Date of Patent: Aug. 4, 1998

[54] VIDEO TAPE PLAYBACK MODE DECISION CIRCUIT AND VIDEO APPARATUS USING THE SAME

[75] Inventor: Hirokazu Tagiri, Kyoto, Japan

[73] Assignee: Rohm Co., Ltd., Kyoto, Japan

[21] Appl. No.: 934,316

[22] Filed: Aug. 25, 1992

[30] Foreign Application Priority Data

Aug. 28, 1991 [JP] Japan .................................... 3-242604

[51] Int. Cl.[6] ...................................................... G11B 15/46

[52] U.S. Cl. ........................................................... 360/73.06

[58] Field of Search ................................ 360/73.06, 74.1, 360/73.07, 74.4

[56] References Cited

U.S. PATENT DOCUMENTS 4,338,640 7/1982 Yabu et al. ...................... 360/73.06 X 4,553,182 11/1985 Narita ................................ 360/74.2 X 5,057,784 10/1991 Park ................................ 360/73.06 X

FOREIGN PATENT DOCUMENTS 54-109408 8/1979 Japan ................................ 360/73.06

*Primary Examiner*—Aristotelis M. Psitos

*Attorney, Agent, or Firm*—Fay, Sharpe, Beall, Fagan, Minnich & McKee

[57] ABSTRACT

A video tape playback mode decision circuit has a mode detection circuit, a control signal presence/absence detection circuit and a mode selection circuit, and is additionally provided with a tape feed suspension detection circuit so that a standard mode detection circuit is prevented from occurring by invalidating the detection signal of a CTLS detection circuit for detecting that the control signal has not been produced while a video tape remains stationary.

12 Claims, 3 Drawing Sheets

10
SP
LP
EP
3
MODE SELECTION CIRCUIT
CFGNO
CTLNO
MSP
MLP
MEP
TAPE FEED SUSPENSION DETECTION CIRCUIT
CONTROL SIGNAL PRESENCE/ABSENCE DETECTION CIRCUIT (CTLS DETECTION CIRCUIT)
MODE DETECTION CIRCUIT
11
12
1
8a
REFb SIGNAL
REFa SIGNAL
CTL SIGNAL
CFG SIGNAL
CLK
FREQUENCY DIVIDER CIRCUIT
FREQUENCY DIVIDER CIRCUIT
8b
CTLG
CFG
17
5
16
4
CAPSTAN MOTOR

10a
TAPE FEED SUSPENSION DETECTION CIRCUIT
11
CONTROL SIGNAL PRESENCE/ABSENCE DETECTION CIRCUIT (CTLS DETECTION CIRCUIT)
2
MODE DETECTION CIRCUIT
1
MODE SELECTION CIRCUIT
13
13a
13b
13c
CFGNO
CTLNO
MSP
MLP
MEP
SP
LP
EP
REFb
REFa
CTL
CFG
CLK 9
3
MODE SELECTION CIRCUIT
SP
LP
EP
CTLNO
MSP
MLP
MEP
2
CONTROL SIGNAL PRESENCE/ABSENCE DETECTION CIRCUIT (CTLS DETECTION CIRCUIT)
1
MODE DETECTION CIRCUIT
REFa SIGNAL
CTL SIGNAL
CFG SIGNAL
CLK
8
FREQUENCY DIVIDER CIRCUIT
7
CTLG
5
CFG
4
CAPSTAN MOTOR
6

VIDEO TAPE PLAYBACK MODE DECISION CIRCUIT AND VIDEO APPARATUS USING THE SAME

BACKGROUND OF THE INVENTION

1. Technical Field

The present invention relates generally to a video tape playback mode decision circuit and a video apparatus using the same, and more particularly to improvements in a so-called video tape playback mode decision circuit for outputting a mode selection signal for making a video tape playback mode automatically correspond to a recording mode in conformity with a standard, twofold and threefold recording speed mode in a video apparatus capable of recording pictures at different speeds, namely, at a standard, a twofold and a threefold tape speed (those which will be described in this specification include a video apparatus incorporating a camera, a portable or stationary video tape recorder and a video apparatus incorporating a television).

2. Background Art

Video tape recorders are now widespread among households and high performance with respect to operability and response efficiency in addition to fundamental performance and basic functions is required for home electric apparatus of this sort. One of the basic functions is concerned with a recording mode, which includes a standard recording time mode [SP (Standard Play) mode in playback], a twofold recording time mode [LP (Long Play) mode in playback], a threefold recording time mode [EP (Extended Play) mode in playback] and a further higher speed mode. These recording modes other than the standard mode are intended to save the amount of video tape consumption by making the video tape feed speed lower than the standard feed speed so that one and the same tape may be used to record pictures for hours.

As there exists a negative interrelationship between the saving of a video tape and picture recording precision, almost all video tape recorders have a plurality of modes as stated above and this makes it possible to record pictures in the mode selected by the user. In other words, the playback mode has been so arranged that it can automatically be switched in conformity with the recording mode when the video tape is played. The operability has thus been improved.

However, some of the video tapes may be used in such a way that images are recorded from partway through or with part of the tape skipped. In the case of such a video tape, a video signal and a control signal are not recorded on that part of the tape. Consequently, information for use in detecting a recording mode is lacking. In this case, the standard mode in which a video tape is fed at the, highest speed is selected by default from among the recording modes when the video tape is played.

A video tape playback mode decision circuit is designed to decide a state in which the aforementioned recording mode or the control signal is lacking on a video tape loaded with pictures when the video tape is played. A mode signal resulting from the decision made by this circuit is sent to various other circuits in the video tape apparatus. In other words, the mode signal designates the mode of controlling these circuits. FIG. 3 shows a conventional circuit for this purpose.

In FIG. 3, numeral 9 denotes a video tape playback mode decision circuit comprising a mode detection circuit 1, a control signal presence/absence detection circuit (hereinafter referred to as the "CTLS detection circuit") 2 and a mode selection circuit 3.

The mode detection circuit 1 receives a frequency signal CFG (Capstan Frequency Generator Signal, hereinafter referred to as the "CFG signal") corresponding to a rotational angle of a capstan output per predetermined rotational angle of the capstan and a control signal CTL (hereinafter referred to as the "CTL signal") at the time of playback. The recording mode of the video signal recorded on a video tape is detected by detecting, from the CFG signal, the CTL signal and a clock CLK generated in the apparatus, the condition in which the CFG signal determined by the timing measured by the clock CLK is generated and the corresponding number of CTL signals, that is, by detecting the number of generated control signals relative to the predetermined fed amount of a video tape. The CTL signal at the time of playback is normally a signal resulting from extracting only the rise or fall of the control signal recorded on a control track of the video tape after reading the control signal.

Provided that the CTL signal has been recorded on the video tape, the recording condition varies with the recording mode. Consequently, the mode detection circuit 1 detects the condition and outputs one of the standard mode detection signal MSP, twofold mode detection signal MLP and threefold mode detection signal MEP as the result of detection. This circuit holds and keeps outputting the preceding mode detection signal until receiving a control signal corresponding to a new mode. Moreover, the mode detection circuit 1 outputs a detection signal in a preset or standard mode in the initial state.

In this case, the CFG signal is obtained from a frequency generator (CFG) 5 coupled to a capstan motor 4. The CTL signal is obtained from a control signal generating circuit (CTLG) 7 connected to a control head 6 and supplied to various circuits as a synchronizing signal for regulating tape feeding, speed and rotational angle of a cylinder and so on.

The CTLS detection circuit 2 receives the CTL signal and a reference signal REFa (hereinafter referred to as the "REFa signal") with a relatively long frequency having a pulse width of about 100 msec and, in the absence of the CTL signal while the REFa signal is being generated, outputs a control signal absence signal CTLNO (hereinafter referred to as the "CTLN0" as if the control signal has not been recorded on the video tape. This signal is not output if there exists at least one CTL signal. The REFa signal is normally obtained as a pulse signal having a width of about 100 msec by normally dividing a clock signal CLK in a frequency divider 8.

Although the mode selection circuit 3 is called so in such a sense that the standard mode is compulsorily selected in the absence of any recording on the video tape, it is equivalent to a mode signal output circuit in that a mode signal (a mode selection signal as viewed from any circuit for receiving it) is output in accordance with the results detected by the mode detection circuit 1 and the CTLS detection circuit 2. This means that one of the three detection signals MSP, MLP and MEP (on thus CTLNO signal thus received) is output.

First, while the CTLNO signal remains insignificant, that is, when this signal has not yet been generated, the detection signal received from the mode detection circuit 1 is directly output. In other words, on receiving the standard mode detection signal MSP, the mode selection circuit 3 supplies it as a standard mode selection signal SP to each circuit in the video apparatus; on receiving the twofold mode detection signal MLP, the circuit supplies it as a twofold mode selection signal LP to each circuit therein; and, on receiving a threefold mode detection signal MEP, the circuit supplies it as a threefold mode selection signal EP to each circuit therein. While the CTLNO signal remains significant, that is, when this signal has been generated, the mode selection circuit 3 compulsorily supplies the standard mode selection signal SP to each circuit in the video apparatus, irrespective of the state of the detection signals MSP, MLP, MEP.

The operation will subsequently be described more specifically. With the CTLNO signal as a significant signal at a HIGH level (hereinafter referred to as "H") and the detection signal in each mode as being also significant at "H", the CTLNO signal itself is output as the standard mode selection signal SP when the CTLNO signal is generated because the standard mode detection signal MSP and the CTLNO signal are received via an OR gate of the mode selection circuit 3. At this time, each of the detection signals MLP, MEP is supplied to an input of an AND logic gate circuit with the NANDed logic signal of the CTLNO signal of each as other input. Therefore, these detection signals are blocked by the gate circuit from being output even though these signals are generated and consequently not output.

In the case of the decision circuit 9 thus conventionally arranged, however, the standard mode selection signal SP is forced to be thus output when the feeding of the video tape is stopped or suspended. In the state in which the feeding of the tape is stopped, including that state where the feeding of the tape is suspended, each circuit for receiving the mode selection signal of the video tape recorder assumes the control posture of feeding the tape in the standard mode. In the conventional circuit, the control condition in the standard mode is only to be restored after the feeding of the tape is stopped when the contents recorded in a mode other than the standard mode are played back.

As a result, upon the restart of playback after the stationary condition is established, the contents recorded in a mode other than the standard mode are played back by feeding the tape on the presumption of the standard mode first. Then the mode detection circuit generates another mode detection signal and awaits the result detected in order to switch the previous mode to a playback mode corresponding to the natural recording mode. As a result, it takes time for the entry of the corresponding playback mode to be established when the recorded mode is not the standard mode so that the response efficiency until the desired operation is performed tends to remain unsatisfactory. Particularly in the case of a video apparatus in which the operation of suspending, rewinding and playing a tape is frequently performed, the aforementioned inconveniences reduce its operability.

SUMMARY OF THE INVENTION

An object of the present invention is to provide a video tape playback mode decision circuit capable of improving playback response efficiency when the playback of the contents of a video tape is restarted from the stationary state of the tape at the time it is played in a recording mode other than a standard mode.

Another object of the present invention is to provide a video tape playback mode decision circuit for a video apparatus which is readily operated when the playback of the contents of a video tape is restarted from the stationary state of the tape at the time it is played in a recording mode other than a standard mode.

Still another object of the present invention is to provide a video apparatus which is readily operated at the time a video tape is played in a recording mode other than a standard mode.

The video tape playback mode decision circuit according to the present invention features a mode detection circuit, a CTLS detection circuit, a mode selection circuit is and a tape feed suspension detection circuit (hereinafter referred to as a "feed suspension detection circuit") in order to block a standard mode detection signal from being generated by invalidating the detection signal of the CTLS detection circuit for detecting the fact that no control signal has been generated while the tape remains stationary.

In this way, it is made possible by adding only the feed suspension detection circuit to the conventional video tape playback mode decision circuit to divide the state in which the playback control signal is absent into a case where the tape is not traveling and a case where the playback control signal is absent even while the tape is traveling (i.e., when no control signal has been recorded). The standard mode selection signal can be output compulsorily in only the latter case. When the video tape recorded in a mode other than the standard mode is played, the video apparatus is consequently permitted to start feeding the tape with the mode set immediately before its suspension as a premise because the mode is not switched at the time the playing of the tape is restarted from its stationary state. Therefore, the video apparatus with the video tape thus suspended is capable of instantly proceeding in the recording mode originally intended, and response efficiency during the playback operation is thus improved.

When a recording is played back while there exists a portion recorded in any other playback mode midway, that is, there exists mode-to-mode discord or when playback is sought from a portion lacking in a recording, no control signal is detected and thereby the present mode is switched to a preset mode or the standard mode. Consequently, no inconvenience is caused.

DESCRIPTION OF THE PREFERRED EMBODIMENTS

Figure 1:
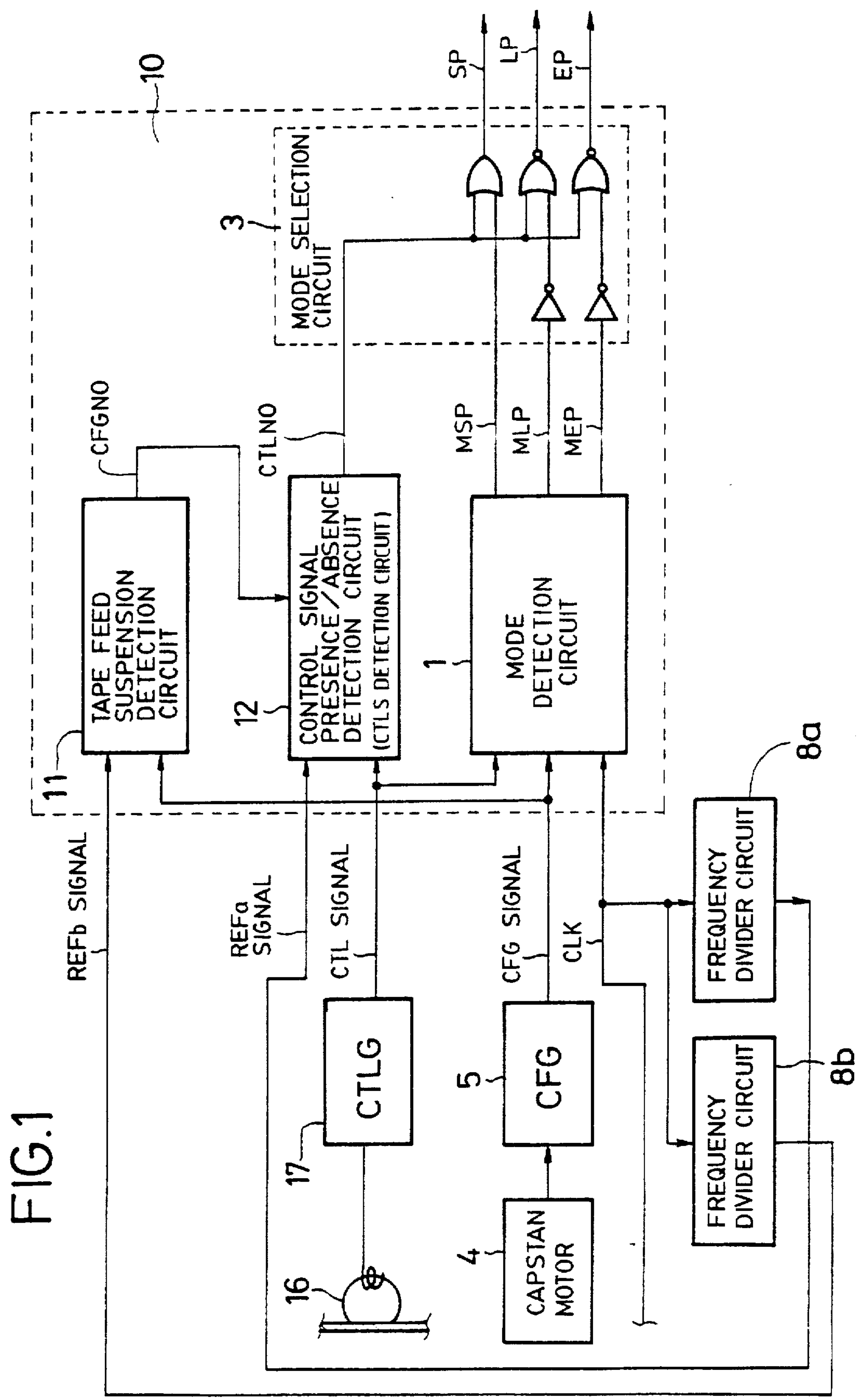
FIG. 1 is a block diagram illustrating the construction of a video tape playback mode decision circuit embodying the present invention.

As shown in FIG. 1, a video tape playback mode decision circuit 10 comprises a mode detection circuit 1, a feed suspension detection circuit 11, a CTLS detection circuit 12 and a mode selection circuit 3. Although the CTLS detection circuit 12 is substantially similar to the CTLS detection circuit 2 of FIG. 3, it differs from the latter in that its output is suspended upon receipt of a detection signal from the feed suspension detection circuit 11.

Figure 3:
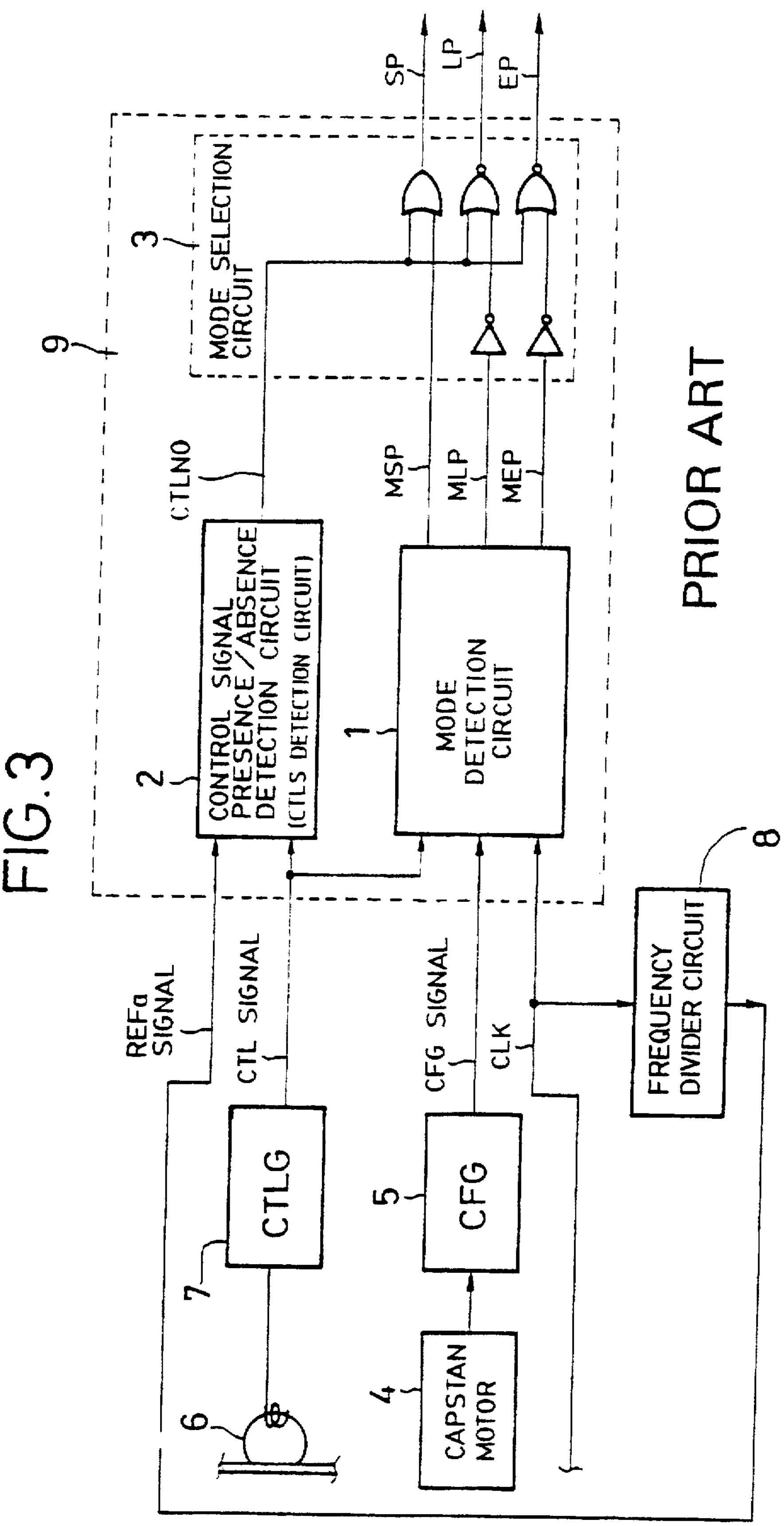
FIG. 3 is a block diagram illustrating the construction of a conventional video tape playback mode decision circuit.

Because the mode detection circuit 1 and the mode selection circuit 3 are also similar to those of FIG. 3, the description of them will be omitted. The description of the CTLS detection circuit 12 will also be omitted as it is similar to what is shown in FIG. 3 except the point stated above. Incidentally, a frequency divider 8*b* divides a clock signal CLK in such a way as to generate a reference signal REFb (hereinafter referred to as "REFb signal") having a pulse width substantially corresponding to a period during which a rotary head causes a cylinder to make a half turn and the outcome is supplied to the feed suspension detection circuit 11. Since the reference pulse may readily be generated by dividing a clock signal by simply providing a frequency divider or otherwise by introducing a signal from any other circuit component, a specific circuit is provided for the decision circuit 10 in this video apparatus.

The feed suspension detection circuit 11, which has newly been provided, functions in a way substantially similar to the way in which the CTLS detection circuit 2 does. What makes this circuit different is that it receives a REFb signal instead of the REFa signal and a CFG signal instead of the CTL signal, and further generates a tape feed suspension detection signal CFGNO (hereinafter referred to as the "CFGNO signal") instead of the CTLNO signal as its output. In other words, the feed suspension detection circuit 11 detects whether or not the CFG signal is generated for a period during which the REFb signal is generated on receiving the REFb signal and the CFG signal, the signal REFb having a pulse width substantially corresponding to a period during which a rotary head makes a half turn. The stationary state of a video tape is detected from the absence of the CFG signal during the aforementioned period and the signal thus detected is supplied to the CTLS detection circuit 12 as the CFGNO signal indicating the stationary state of the tape. This output signal is not produced when at least one CFG signal has been generated.

The CTLS detection circuit 12 receives the CFGNO signal in addition to the CTL signal and the REFa signal. While the CFGNO signal is being generated, the output is blocked and the CTLNO signal is output when the CFGNO signal is absent and when the REFa signal is absent with the CTL signal. In other words, the CTLNO signal is output only when the video tape is running and when no control signal is decided to have been recorded on the video tape.

While the tape is moving the decision circuit 10 consequently performs like the decision circuit 9 of FIG. 3. While the tape remains stationary, on the other hand, the feed suspension detection circuit 11 detects the absence of the CFG signal and outputs the CFGNO signal. As a result, the CTLS detection circuit 12 generates no CTLNO signal in the aforementioned state even though the CTL signal has not been generated. In other words, the CTLNO signal is output only when no control signal has been recorded on the video tape on condition that the video tape is being fed. Therefore, the condition under which the standard mode selection signal SP is compulsorily output is restricted to the aforementioned condition. While the tape remains stationary, moreover, the preceding mode detection signal remains valid and it is output from the mode detection circuit 1 as a mode selection signal.

While the aforementioned state is kept until the mode selection signal is received by the circuit for receiving the signal next, it is unnecessary to hold the preceding mode selection signal.

Figure 2:
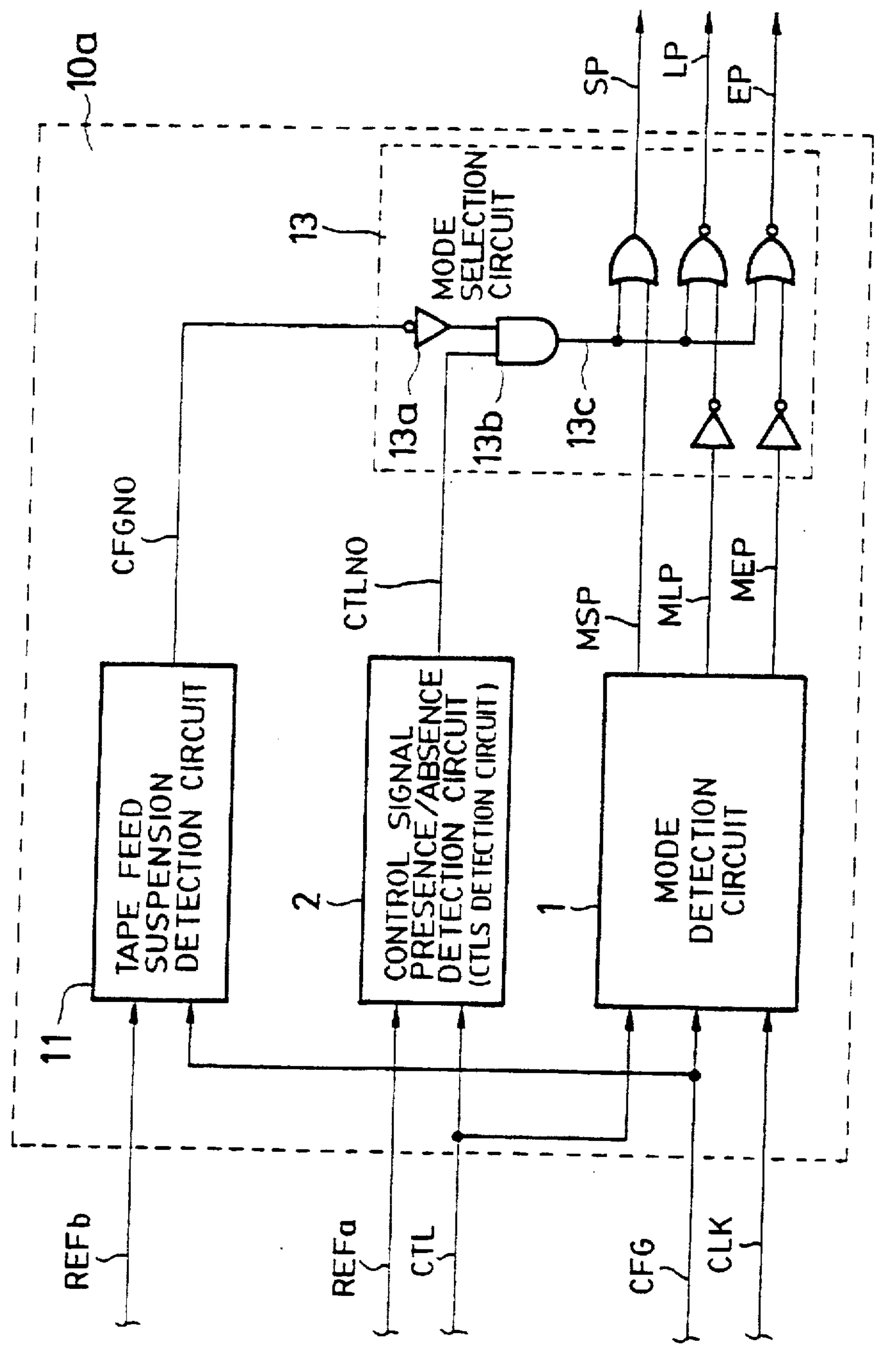
FIG. 2 is a block diagram illustrating the construction of another video tape playback mode decision circuit embodying the present invention.

FIG. 2 is a block diagram of a decision circuit **10*a* comprising the same mode detection circuit 1 and the feed suspension detection circuit 11 in the arrangement as shown in the embodiment of FIG. 1, the same CTLS detection circuit 2 in the arrangement as shown in the conventional example, and a mode selection circuit 13 having additional gates 13*a*, 13*b* in contrast to the mode selection circuit 3 of FIG. 3**.

Input signals CFG, CTL, CLK, REFa, REFb, mode detection signals MSP, MLP, MEP, and mode selection signals SP, LP, EP are the same as those referred to in the embodiment of FIG. 1.

The CFGNO signal is a "H" significant signal and in this case, this signal is supplied via the NOT gate **13*a* to one input of the two-input AND gate 13*b*. Then the CTLNO signal is supplied to the other input of the AND gate 13*b*. Therefore, the CTLNO signal becomes valid when the CFGNO signal is at a LOW level. As a result, a gate signal is supplied to a signal line 13*c* and the mode selection circuit 13** is caused to output the standard mode selection signal SP on condition that the video tape is being fed and that no control signal has been recorded on the video tape.

As is obvious from the description above, the signal on the signal line **13*c* in the embodiment of FIG. 2 becomes equivalent to the CTLNO signal in the embodiment of FIG. 1**.

Therefore, the embodiment of FIG. 2 is seen to become equivalent to that shown in FIG. 1 if the gates **13*a*, 13*b*** are incorporated in the CTLS detection circuit.

Although a description has been given of a case where the clock signal CLK, the REFa, REFb signals and the like are given from outside the decision circuit 10 or **10*a*, these signals may be caused to be generated individually in either of them including the decision circuit 10**, the respective detection circuits and the mode selection circuit.

Although the pulse having a pulse width corresponding to a period necessary for detecting the REFa signal, REFb signal and the like is generated by dividing the clock signal generated in the video apparatus, one could also provide a predetermined time pulse generating circuit therein to make it unnecessary to supply such a pulse to the frequency divider circuits **8*a*, 8*b***. Moreover, it has been arranged to supply, to the mode detection circuit and the tape feed detection circuit, the rotational frequency signal generated in proportion to the rotation of the capstan. However, this signal may be any signal as long as it refers to the condition in which the video tape is being fed.

What is claimed is:

1. A video tape playback mode decision circuit which reads a control signal recorded on a video tape being fed at a feed speed, and selects either a standard play mode or one of a plurality of predetermined modes that include a different playback speed from that of the standard play mode in accordance with a mode signal representing one of said play modes, said mode signal being generated in accordance with a relation between said control signal thus read and said feed speed, comprising:

a first detection circuit which generates a mode detection signal corresponding to the mode detected on receiving said control signal read from said video tape and to a feed condition signal representing the feed condition of said video tape, by detecting which one of said predetermined play modes is applicable in response to the control signal and the feed condition signal, a second detection circuit for receiving said control signal and for thereby detecting whether or not said control signal has been recorded on said video tape, a third detection circuit for receiving said feed condition signal and for thereby detecting whether or not the feed of said video tape is suspended, and a mode signal output circuit which outputs said mode signal in conformity with said standard mode on receiving said detection signal respectively from said first, second and third detection circuits in a case when said video tape remains unstationary and said control signal has not been recorded on said video tape, and outputs said mode signal obtainable from said first detection circuit in any other case.

2. A decision circuit as claimed in claim 1, wherein said feed condition signal is a rotational speed signal obtained as a capstan rotates for feeding said video tape, and wherein on receiving a clock signal having a predetermined period, said first detection circuit detects one of said play modes in accordance with the condition in which said rotational speed signal and said control signal are generated for a period determined by said clock signal.

3. A decision circuit as claimed in claim 2, further comprising a capstan frequency generator for detecting the rotational condition of said capstan, wherein said feed condition signal is obtained from said capstan frequency generator, wherein on receiving a first pulse having a predetermined first pulse width, said second detection circuit detects whether or not said control signal exists during the period designated by said first pulse width, and wherein on receiving a second pulse having a predetermined second pulse width, said third detection circuit detects whether or not said rotational speed signal exists during the period designated by said second pulse width.

4. A decision circuit as claimed in claim 3, wherein on receiving said clock signal having a predetermined period, said first detection circuit detects which one of said play modes is applicable in response to the signal obtainable from said capstan frequency generator and generated during the period determined by said clock signal, and holds said play mode detection signal until a subsequent detection signal is generated that is different from said held play mode detection signal, said first and second pulses being respectively generated by dividing said clock signal.

5. A decision circuit as claimed in claim 4, wherein said predetermined play mode comprises one of a plurality of play modes having different respective tape feed speeds, wherein said predetermined feed speed is a speed at which said video tape is fed in a feed speed control condition corresponding to one of said standard play mode and said plurality of play modes, and wherein said first detection circuit generates mode detection signals corresponding to the detected one of said standard play mode and said plurality of play modes, respectively.

6. A decision circuit as claimed in claim 5, wherein said first detection circuit has terminals each of which outputs said mode detection signal corresponding to the mode thus detected, wherein said mode signal output circuit has input terminals for receiving respective mode detection signals from respective output terminals of said first detection circuit and output terminals corresponding to the respective input terminals, and wherein said mode signal output circuit is a selection circuit for selecting one of said output terminals of said first detection circuit for outputting said mode detection signal corresponding to said standard play mode when said control signal has not been recorded on said video tape while said video tape remains unstationary.

7. A decision circuit as claimed in claim 5, wherein said first detection circuit has output terminals each of which outputs said mode detection signal corresponding to the play mode thus detected, wherein said mode signal output circuit has input terminals for receiving respective mode detection signals from respective output terminals of the first detection circuit and output terminals corresponding to the respective input terminals, and wherein said mode signal output circuit is a selection circuit for selecting one of said output terminals of the first detection circuit for outputting said mode detection signal corresponding to a preceding play mode while said video tape remains stationary.

8. A video tape playback mode decision circuit in a video apparatus for playing back a video signal recorded on a video tape in a standard play mode in which said video tape is fed at a standard speed and in any other play mode in which said video tape is fed at a different speed, wherein on receiving a control signal read from said video tape and receiving an output signal synchronized with the feed speed of said video tape from a capstan frequency generator, said decision circuit generates a mode signal for setting one of said play modes in response to these signals, said decision circuit comprising:

a tape feed suspension detection circuit for outputting a tape suspension detection signal representing a stationary condition of said video tape on receiving said output signal, and a mode signal output circuit for generating said mode signal for setting said standard play mode when said tape suspension detection signal is absent for a predetermined period of time and when said control signal is also absent.

9. A video tape playback mode decision circuit, wherein on receiving a control signal read from said video tape for setting a play mode, and receiving an output signal synchronized with the feed speed of said video tape from a capstan frequency generator at the time of playing said video tape, said decision circuit selects one of a standard play mode and a plurality of other play modes in response to these signals, and selects said standard mode when no control signal has been recorded on said video tape, said decision circuit comprising:

a tape feed suspension detection circuit for outputting a tape suspension detection signal representing that said video tape is not being fed on receiving the signal from said capstan frequency generator, and a gate circuit which receives the tape suspension detection signal and a mode signal for setting said standard play mode, said decision circuit being refrained by said gate circuit from changing play mode selection to selecting said standard play mode when said tape suspension detection signal has been generated while said control signal is present on said video tape.

10. A decision circuit as claimed in claim 9, wherein said decision circuit holds said play mode detection signal until a subsequent detection signal is generated, and generates, on the basis of the held play mode detection signal, said mode signal for continuing the current mode when said tape feed suspension detection signal is generated.

11. A video apparatus for playing back a video signal recording on a video tape in a standard play mode in which said video tape is fed at one of a standard speed and other play modes in which said video tape is fed at a different speed, said video apparatus comprising:

a tape feed suspension detection circuit for outputting a tape suspension detection signal representing that said video tape is not being fed on receiving a control signal read from said video tape and receiving an output signal synchronized with the feed speed of said video tape from a capstan frequency generator, and a mode decision circuit for generating a mode signal for setting said standard play mode when said tape suspension detection signal as well as said control signal are absent for a predetermined period on receiving said tape suspension detection signal, said control signal and said output signal, and for generating a mode signal for setting one of said other play modes in response to said control signal and said output signal.

12. A video apparatus as claimed in claim 11, wherein said other play modes comprise a plurality of play modes in which tape feed speeds are different from each other, and wherein said decision circuit generates said mode signal for setting one of said standard play mode and said plurality of play modes in response to said control signal and said output signal.

* * * * *